E. E. PAISLEY.
BASKET COVER FASTENER.
APPLICATION FILED NOV. 2, 1914.
1,144,376.
Patented June 29, 1915.
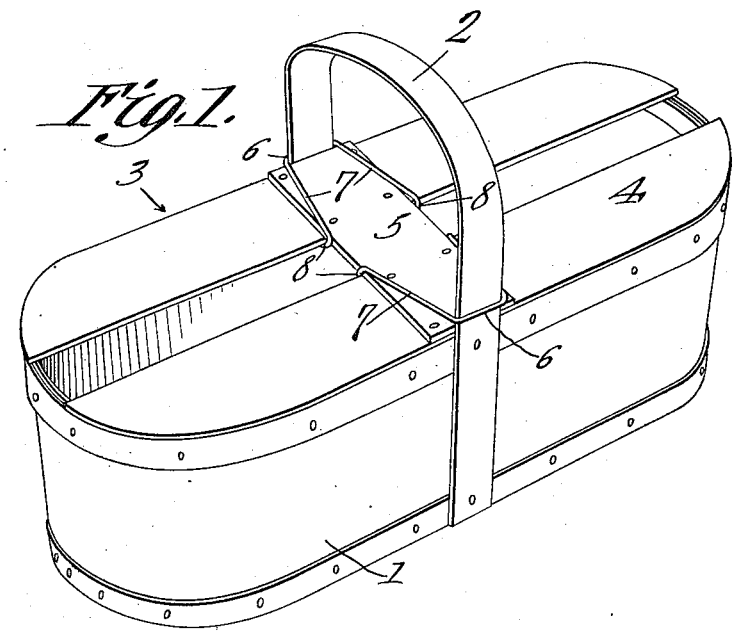
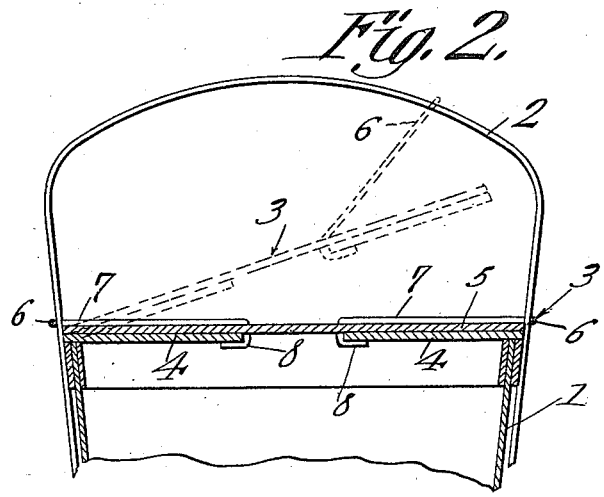
E. E. Paisley
Inventor
Witnesses
by
Attorneys

# UNITED STATES PATENT OFFICE.

ELBERT E. PAISLEY, OF PORTVILLE, NEW YORK.

BASKET-COVER FASTENER.

1,144,376.

Specification of Letters Patent. Patented June 29, 1915.

Application filed November 2, 1914. Serial No. 869,881.

*To all whom it may concern:*

Be it known that I, ELBERT E. PAISLEY, a citizen of the United States, residing at Portville, in the county of Cattaraugus and State of New York, have invented a new and useful Basket-Cover Fastener, of which the following is a specification.

The present invention appertains to fasteners for grape or fruit basket covers, and aims to provide a novel and improved device of that nature.

It is the object of this invention, to provide unique, yet simple and effective means for fastening the basket cover in place over the basket, which may be readily applied to the handle and cover of the basket, and which will enable the cover to be held open as well as closed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a perspective view of a grape or fruit basket having the present fasteners applied thereto. Fig. 2 is an enlarged fragmental section of the basket having the improved fasteners applied to the cover, the cover being shown in open position in dotted lines.

Referring to the drawing, there is delineated an ordinary grape or fruit basket 1, having the arched or bail handle 2 terminally attached to its sides and spanning or bridging the basket as usual. The basket cover 3 is of slatted construction, and includes the longitudinal slats 4, connected by a central cross strip 5 secured upon the intermediate portions of the slats 4 and arranged within the handle 2 when the cover 3 is in place.

The fasteners 6, of which there are two in number, are constructed from short lengths of bendable or flexible wire, and in applying the fasteners 6 after the cover 3 is closed, they are bent or doubled into approximate U-shape so as to pass around the outer sides of the upright portions of the handle 2, and to provide the inwardly diverging arms 7 straddling the cross piece 5 of the cover and projecting to the inner or adjacent edges of the spaced slats 4. The ends or terminals of the arms 7 of the wire fasteners 6 are bent downwardly or reflexed to provide hooks 8 engaging under the inner edges of the slats 4 at the side edges of the cross piece 5, which will firmly anchor the fasteners to the cover, and which will also hold the cover in place relative to the basket. The fasteners 6 in having the terminal hooks 8 engaged over the inner edges of the slats 4 and resting upon the cross piece 5 and passing around the upright or side portions of the handle 2, will hold the cover securely in place upon the basket.

One edge portion of the cover may be raised, as depicted in dotted lines in Fig. 2, to expose the grapes or other fruit from one side of the basket, for purpose of display or examination, it being noted that when the cover is swung upwardly upon one edge or one side of the basket, the raised fastener 6 may swing upwardly onto the yoke or crest portion of the handle for supporting the cover in open or raised position. When the raised fastener is again swung against the cover, the fastener and cover being held together, may be slid downwardly along the corresponding side of the handle to again close the cover. The present fasteners also assist in holding the sides of the basket against bulging outwardly against the pressure of the fruit in the basket. The fasteners may also be employed for holding the cover elevated above the basket, since the elevated cover having the fasteners applied thereto, will be held in position relative to the handle. The fasteners may also be employed upon a one piece cover, which is properly punched or slotted for the engagement of the hooks of the fasteners. The present device may also be employed for securing the covers of bushel baskets, and other containers for which they are suited.

Having thus described the invention, what is claimed as new is:—

1. A basket having an arched handle, a cover for the basket having longitudinal slats, and doubled wire fasteners extending around the upright portions of the handle and having inwardly extending arms provided with terminal hooks engaging over the inner edges of the cover slats.

2. A basket having an arched handle, a cover for the basket embodying a pair of longitudinal slats and a central cross piece secured thereon within the handle, and a pair of wire fasteners doubled to engage around the upright portions of the handle and to provide inwardly diverging arms having terminal hooks engaging over the inner edges of the slats at the side edges of the cross piece.

In testimony that I claim the foregoing as my own, I have hereto affixed my signature in the presence of two witnesses.

ELBERT E. PAISLEY.

Witnesses:
  CHAS. E. GRIFFITH,
  FRANCIS J. RILEY.

Copies of this patent may be obtained for five cents each, by addressing the "Commissioner of Patents, Washington, D. C."